Patented Apr. 21, 1936

2,037,781

UNITED STATES PATENT OFFICE 2,037,781

TREATMENT OF HYDROCARBON OILS

Aristid V. Grosse, Chicago, Ill., assignor to Universal Oil Products Company, Chicago, Ill., a corporation of Delaware No Drawing. Application March 14, 1933,
Serial No. 660,679

8 Claims. (Cl. 196—36)

This invention relates to the treatment of hydrocarbon oils and refers more particularly to the treatment of the lower boiling distillates produced by cracking heavier hydrocarbon oil mixtures though the process is also applicable to the treatment of similar distillates produced in the straight run distillation of petroleums and other hydrocarbon materials.

In a more specific sense the invention has reference to a process for desulphurizing hydrocarbon motor fuel fractions or naphthas containing a substantial percentage of the same by employing novel catalysts and conditions of operation which have been found to be specially effective in removing the sulphur. While the reduction of sulphur constitutes the outstanding feature of the process, other beneficial treating effects are obtained by the reactions of the treatment which add value to the process, these special advantages being referred to in the following specification describing the major features of the invention.

Sulphur compounds of different type exist in varying percentages in all petroleum distillates, and are present in unusually large amounts in the pressure distillates resulting from the pyrolysis of sulphur-containing oils. The form of combination of the sulphur also varies, some hydrogen sulphide being present along with mercaptans, sulphur ethers, thiophenes, etc., the ease of removal of these compounds by different methods of treatment decreasing generally in order named. The sulphur contained in heterocyclic ring compounds of the thiophene type is particularly resistant to treating influences, and is ordinarily lost only on severe treatment such as that involving the use of excessive amounts of strong sulphuric acid or high pressure hydrogenation with excess of hydrogen and active catalysts. Inasmuch as present day motor fuel specifications still require a sulphur content of less than 0.1%, the removal of sulphur down to this point from gasolines produced by cracking sulphur-containing oils is a problem of major importance and various investigators in this field have sought to devise special and selective treatments for removing the requisite amount of sulphur without incurring large losses of material, particularly hydrocarbons of high anti-knock value. The use of sulphuric acid for removal of sulphur is in many cases highly destructive of hydrocarbon material and many substitutes have been offered therefor among which may be mentioned limited hydrogenation in the presence of selected catalysts. It is with improvements in processes of the last named character that the present invention is specially concerned.

In one specific embodiment the invention comprises treatment of sulphur-containing hydrocarbon oil distillates, particularly vapors of cracked distillates of motor fuel boiling range with hydrogen containing gases in the presence of a catalyst comprising cobalt thiomolybdate and sodium aluminate.

I have determined that compound catalysts of this character containing on the one hand 85 to 95% of cobalt thiomolybdate ($CoMoS_4$) and on the other hand 5 to 15% of sodium aluminate as a promotor catalyst are of particular effectiveness in influencing the course and speed of limited hydrogenation reactions leading to the desulphurization of cracked vapors. Temperatures of 500 to 700° F. may be employed and pressures of from 100 to 300 lbs. per sq. in., depending upon the percent and type of sulphur compounds present, the character of the other hydrocarbon material, the degree of desulphurization desired and other factors.

Thiomolybdates may be considered generally as molybdates in which the oxygen in the acid radical is partially or completely replaced by sulphur. Such compounds may be represented by the formulas $R_2'MoS_4$, $R_2'Mo_2S_7$ and $R_2'Mo_3S_{10}$ when the oxygen is completely replaced by the sulphur and by generally similar formulas in which only part of the oxygen has been thus replaced, $R'$ representing any monovalent metal of any valence.

Soluble thiomolybdates are prepared by the action of hydrogen sulphide on solutions of molybdates or by the action of soluble sulphides on molybdenum trisulfide. Insoluble thiomolybdates are formed by adding a solution of an alkali or alkaline earth thiomolybdate to a solution of a metal salt, or vice versa. The cobalt thiomolybdate whose use constitutes the main feature of the present invention may be conveniently prepared by adding a relatively concentrated solution of cobalt nitrate to a solution of ammonium thiomolybdate, the precipitate which forms having the average approximate composition indicated by the formula $CoMoS_4$. This precipitate is usually a reddish brown more or less granular material depending upon the purity of the reagents employed and the conditions of precipitation. It may be filtered, washed and dried and receive the desired addition of sodium aluminate by being added to a fairly concentrated solution of the last named salt, the solution being heated and concentrated to the point corresponding to the desired adsorption of aluminate on the surface and in pores of the thiomolybdate constituting the base catalyst. Alternative methods of preparation may be employed in which the sodium aluminate is present in the ammonium molybdate solution so that the aluminate is occluded by the precipitate during its formation. If desired, any of the precipitations or treatments may be conducted in the presence of suspended relatively inert silicious adsorptive or carrying materials such as fuller's earth, precipitated silica, crushed firebrick and other similar materials so that a composite catalyst is produced in one operation and may then be washed to remove adhering substances, dried and heated to a suitable temperature for imparting the desired physical properties.

In conducting desulphurizing operations upon cracked vapors when catalysts of the present character are employed only simple and readily procurable equipment is necessary, the prepared catalyst being disposed as filler in vertical or horizontal tubes or treating chambers properly designed with respect to the ratio of cross section to length so that the vapors to be treated mixed with hydrogen or hydrogen-containing gases may be passed therethrough at economic space velocities without undesirably large pressure drop. In some instances the catalysts may be distributed in thin layers upon regularly spaced trays so that the vapors plus hydrogen do not pass through the entire mass of catalyst but merely contact the surface of the same. The amount of hydrogen necessary to mix with the vapors will depend to some extent upon the character and amount of the sulphur compounds but will usually not exceed 10 to 15% by volume of the vapors as such.

As an example of results obtainable by the use of the process those obtained when treating a California gasoline produced from the final fractionator of a cracking plant may be considered. These vapors are produced under a pressure of approximately 250 lbs. per sq. in. at a temperature of 475° F. Prior to passage through the catalyst they may be superheated to a temperature of approximately 600° F. The catalyst, prepared by the general method previously outlined, may comprise 90% of the cobalt thiomolybdate and 10% of sodium aluminate. The following tabulation of comparative data shows the properties of the gasoline before and after treatment in the manner described.

*Comparison of untreated and treated gasolines*

| | | |
|---|---|---|
| Gravity, °A. P. I. | 52 | 52.5 |
| End point °F | 400 | 396 |
| Color, Saybolt | 18 | +30 |
| Mg. gum by copper dish | 225 | 10 |
| Total sulphur percent | 0.35 | 0.09 |
| Octane number | 75 | 74 |

The advantages of the process are evident from a consideration of the above data, which shows an improvement in all respects. The yield of gasoline was practically 100% insofar as exact measurements were possible. The slight loss in octane number was due to saturation of the more highly unsaturated olefinic constituents of the gas but this loss is more than compensated for by the decrease in sulphur and gum content and the increase in color and color stability under storage conditions.

While the foregoing specification and the numerical data given are sufficient to indicate the advantages of the use of the process of the invention, neither are to be construed as imposing limitations upon the scope of the invention.

I claim as my invention:

1. A process for the treatment of hydrocarbon distillates to refine and to remove objectionable sulphur or the compounds thereof from the same, which comprises subjecting the said hydrocarbon distillates to the action of hydrogen in the presence of a catalyst comprising cobalt thiomolybdate and sodium aluminate at a temperature adequate to react the hydrogen with sulphur compounds contained in the distillate.

2. A process for the treatment of hydrocarbon distillates to refine and to remove objectionable sulphur or the compounds thereof from the same, which comprises subjecting the said hydrocarbon distillates to the action of hydrogen while in heated vaporous condition in the presence of a catalyst comprising cobalt thiomolybdate and sodium aluminate at a temperature adequate to react the hydrogen with sulphur compounds contained in the distillate.

3. A process for the treatment of hydrocarbon distillates to refine and to remove objectionable sulphur or the compounds thereof from the same, which comprises subjecting the said hydrocarbon distillates to the action of a hydrogen containing gas at elevated temperatures of from 500 to 700° F. in the presence of a catalyst comprising cobalt thiomolybdate and sodium aluminate.

4. A process for desulphurizing hydrocarbon oil which comprises treating the oil with hydrogen in the presence of a mixture of a major proportion of cobalt thiomolybdate and a minor proportion of sodium aluminate, at a temperature adequate to react the hydrogen with sulphur compounds contained in the oil.

5. A process refining cracked hydrocarbon distillate which comprises treating the distillate at a temperature of from 500 to 700° F. with hydrogen in the presence of a mixture of from 85 to 95% cobalt thiomolybdate and from 5 to 15% sodium aluminate.

6. A catalyst comprising a mixture of cobalt thiomolybdate and sodium aluminate.

7. A catalyst comprising a mixture of a major proportion of cobalt thiomolybdate and a minor proportion of sodium aluminate.

8. A catalyst comprising a mixture of from 85 to 95% cobalt thiomolybdate and from 5 to 15% sodium aluminate.

ARISTID V. GROSSE.